United States Patent
K T

(10) Patent No.: US 12,171,217 B2
(45) Date of Patent: Dec. 24, 2024

(54) METHOD FOR MANAGING AN INSECT SWARM USING DRONES

(71) Applicant: HCL Technologies Limited, New Delhi (IN)

(72) Inventor: Gandhi Karuna K T, Chennai (IN)

(73) Assignee: HCL Technologies Limited, New Delhi (IN)

(*) Notice: Subject to any disclaimer, the term of this patent is extended or adjusted under 35 U.S.C. 154(b) by 0 days.

(21) Appl. No.: 18/239,775

(22) Filed: Aug. 30, 2023

(65) Prior Publication Data

US 2023/0404055 A1 Dec. 21, 2023

Related U.S. Application Data

(63) Continuation of application No. 17/172,795, filed on Feb. 10, 2021, now Pat. No. 11,779,003.

(30) Foreign Application Priority Data

Oct. 6, 2020 (IN) .............................. 202011043508

(51) Int. Cl.
*A01M 5/00* (2006.01)
*A01M 29/16* (2011.01)
(Continued)

(52) U.S. Cl.
CPC .............. *A01M 5/00* (2013.01); *A01M 29/16* (2013.01); *B64U 10/14* (2023.01); *B64U 20/87* (2023.01);
(Continued)

(58) Field of Classification Search
CPC ........ A01M 5/00; A01M 29/16; G05D 1/104; G05D 1/12; B64U 2101/00; B64U 2201/102
See application file for complete search history.

(56) References Cited

U.S. PATENT DOCUMENTS 9,807,996 B1 11/2017 Yu
9,999,213 B2 6/2018 Yu
(Continued)

FOREIGN PATENT DOCUMENTS

CN 2604876 Y 3/2004
DE 202015002320 U1 6/2015
(Continued)

OTHER PUBLICATIONS

Jack Goodman, "The Drone Killing Insect Pests on Farms In Japan".

(Continued)

*Primary Examiner* — Brady W Frazier
*Assistant Examiner* — Shanna Danielle Glover
(74) *Attorney, Agent, or Firm* — Kendal M. Sheets

(57) ABSTRACT

This disclosure relates to system and method for managing an insect swarm using a plurality of drones. The method includes detecting an insect swarm. The method may further include tracking a movement of the insect swarm. The method further includes communicating, with remaining of the plurality of drones, to dynamically align in a position based on the tracking so as to make a drone formation. The method further includes magnetizing, by at least some of the plurality of drones, one or more drone couplers for electromagnetically coupling the at least some of the plurality of drones with each other as per the drone formation. The method further includes casting, by each of the plurality of drones, a net to trap insects in the insect swarm. The method further includes supplying, by each of the plurality of drones, a high voltage to the net to decapitate the insects.

9 Claims, 4 Drawing Sheets

(51) Int. Cl.
*B64U 10/14* (2023.01)
*B64U 20/87* (2023.01)
*G05D 1/00* (2024.01)
*B64U 101/30* (2023.01)

(52) U.S. Cl.
CPC .............. *G05D 1/104* (2013.01); *G05D 1/12* (2013.01); *B64U 2101/30* (2023.01); *B64U 2201/102* (2023.01)

(56) References Cited

U.S. PATENT DOCUMENTS

| | | | |
|---|---|---|---|
| 2016/0378108 A1* | 12/2016 | Paczan | G05D 1/0027 705/330 |
| 2017/0231213 A1 | 8/2017 | Gordon et al. | |
| 2018/0065747 A1* | 3/2018 | Cantrell | G05D 1/0011 |
| 2020/0108926 A1* | 4/2020 | Smith | B64F 1/007 |

FOREIGN PATENT DOCUMENTS

| | | |
|---|---|---|
| JP | 6274430 B2 | 2/2018 |
| JP | 2019517243 A | 6/2019 |
| WO | 2019092707 A1 | 5/2019 |

OTHER PUBLICATIONS

Automated Pest Sampling using Unmanned Aerial Systems, "https://elibrary.asabe.org/login.aspx".

Drone as New Tech to Battle the Crop-Devouring Fall Armyworm, "https://www.xa.com/en/news/application/54".

* cited by examiner

METHOD FOR MANAGING AN INSECT SWARM USING DRONES

TECHNICAL FIELD

This disclosure relates generally to drones, and more particularly to system and method for managing an insect swarm using drones.

BACKGROUND

Every year, global yield of agricultural crops suffers significantly from crop loss. Insect pests, such as locusts, are a common problem faced by the agricultural community around the world. Further, sewers and residences in urban regions house mosquitoes, which are carriers of deadly diseases such as Malaria, Dengue, Filariasis, and the like. Conventionally, the crops, urban sewers, and indoors of residences are subjected to chemical treatment (such as, pesticides, insectides, and the like) as a preventive measure. However, such chemicals are toxic (often carcinogenic), and environmentally hazardous in nature.

Drone technology has been used exhaustively in various aspects of agriculture such as spraying insecticides in a farm, remote sensing, precision agriculture, and the like. In the present state of art, techniques for electrocuting insects using drones exist. However, such techniques deploy drones as individual units. Eliminating insect pests from a large agricultural field may not be feasible through such techniques.

There is, therefore, a need in the present state of art for techniques to effectively manage insect swarms using drones. There is also a need in the present state of art for environmentally safe techniques to manage insect swarms.

SUMMARY

In one embodiment, a system for managing an insect swarm is disclosed. In one example, the system may include a plurality of drones configured to collaborate with each other to manage an insect swarm. Each of the plurality of drones may include a net casting unit configured to cast a net to trap insects in the insect swarm. The net, upon casting, is supplied with a high voltage to decapitate the insects. Each of the plurality of drones may further include a coupling unit configured to magnetize one or more drone couplers for electromagnetically coupling two or more of the plurality of drones as per a dynamically determined drone formation to cast a wider net and to arrest further movement of the insects in the insect swarm.

In one embodiment, a drone is disclosed. In one example, the drone may include an environment data capturing unit configured to capture environment data. The environment data is processed to detect and track the insect swarm and to sense obstacles in a flight path of the drone. The drone may further include a flight control unit configured to navigate the drone and to avoid the obstacles based the detection and tracking. The drone may further include a plurality of fans, each with an insect shield configured to prevent the insects from interfering with the fan. The drone may further include a power source configured to provide power to the drone. The drone may further include a high voltage generator configured to generate the high voltage. The drone may further include a net casting unit configured to cast a net to trap insects in the insect swarm. The net, upon casting, is supplied with a high voltage to decapitate the insects. The drone may further include a coupling unit configured to magnetize one or more drone coupler for electromagnetic coupling the drone with one or more of other drones as per a dynamically determined drone formation to cast a wider net and to arrest further movement of the insects in the insect swarm. The drone may further include a chemical dispensing unit disposed towards a base portion of the net and configured to release one or more chemicals that attract the insects to the base portion of the net.

In one embodiment, a method for managing an insect swarm is disclosed. In one example, the method may include detecting, by at least one of a plurality of drones, an insect swarm. The method may further include tracking, by the at least one of a plurality of drones, a movement of the insect swarm. The method may further include communicating, by the at least one of the plurality of drones with remaining of the plurality of drones, to dynamically align in a position based on the tracking so as to make a drone formation. The method may further include magnetizing, by at least some of the plurality of drones, one or more drone couplers for electromagnetically coupling the at least some of the plurality of drones with each other as per the drone formation. The method may further include casting, by each of the plurality of drones, a net to trap insects in the insect swarm. The method may further include supplying, by each of the plurality of drones, a high voltage to the net to decapitate the insects.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
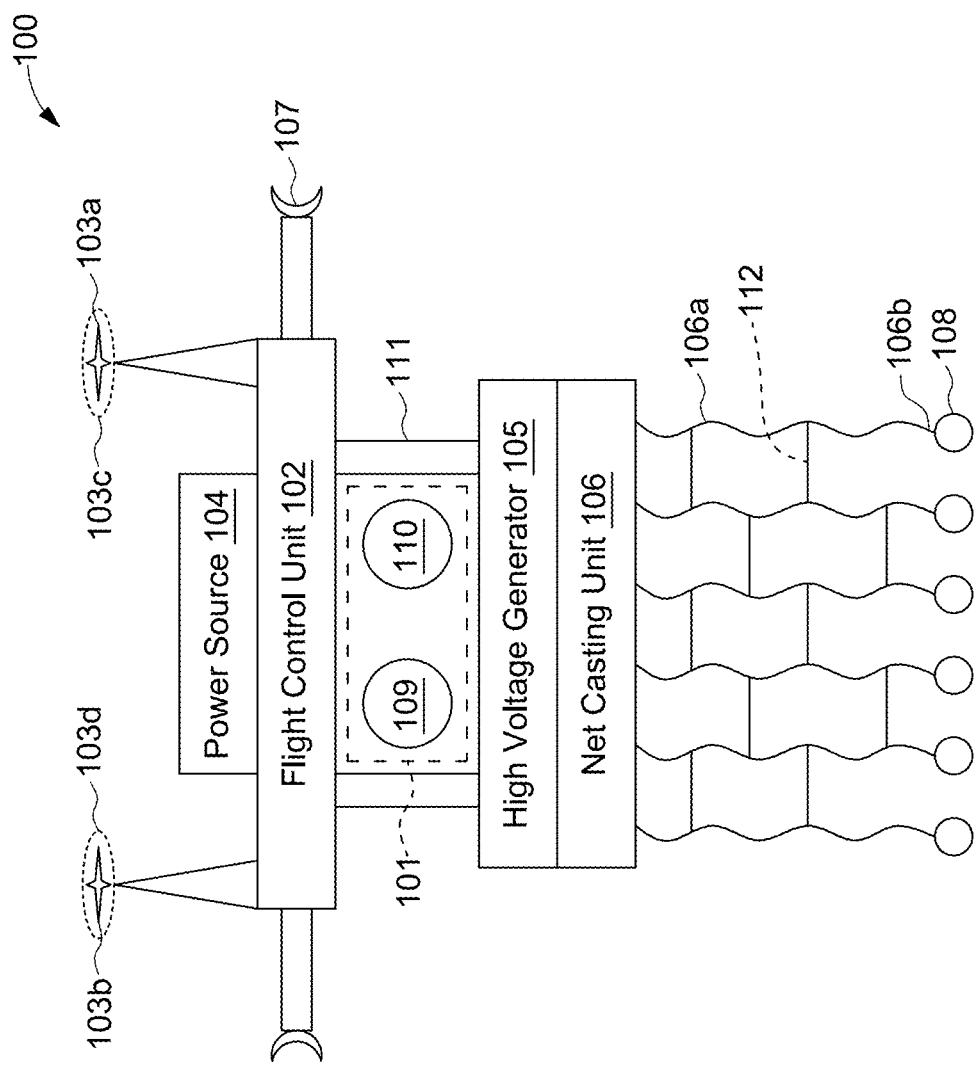
FIG. 1 illustrates an exemplary drone for managing an insect swarm, in accordance with some embodiments of the present disclosure.

Referring now to FIG. 1, an exemplary drone 100 for managing an insect swarm is illustrated, in accordance with some embodiments of the present disclosure. By way of an example, the insect swarm may include insects belonging to one or more taxonomical orders such as, but not limited to, Orthoptera, Lepidoptera, Diptera, Thysanoptera, and Plecoptera. It may be noted that the drone 100 may be a part of a drone formation which may include a plurality of drones. The drone 100 may include an environment data capturing unit 101, a flight control unit 102, a plurality of fans (such as a fan 103a and a fan 103b), a power source 104, a high voltage generator 105, a net casting unit 106, a coupling unit 107, a chemical dispensing unit 108, and an insulating handle 111. The environment data capturing unit 101 may include a sound generator and detector 109 and a camera 110. In an embodiment, the environment data capturing unit 101 may further include a motion sensor (not shown in figure) for detecting and tracking the insect swarm based on movement of the insects in the insect swarm. The environment data capturing unit 101 is configured to detect the insect swarm and track the movement of the insect swarm using each of the sound generator and detector 109, the camera 110, and the motion sensor. Further, the sound generator and detector 109 may generate sound waves to dislodge the insects from their resting places.

The flight control unit 102 may include a wireless remote control module configured to receive and transmit signals for navigating the drone and avoiding the obstacles based on the detection and tracking. In an embodiment, the flight control unit 102 receive signals from a central controlling unit (not shown in figure). In another embodiment, the flight control unit 102 may include a processor and a computer-readable medium (such as, a memory). The computer-readable medium may store processor-executable instructions, which on execution, may cause the processor to autonomously control the drone 100 and dynamically manage the insect swarm, in accordance with aspects of the present disclosure. The computer-readable storage medium may also store various data (for example, environment data, drone formation data, and the like) that may be captured, processed, and/or required by the drone 100.

The plurality of fans 103 a and 103 b may be configured to assist in flight of the drone. Each of the plurality of fans 103 a and 103 b may include an insect shield 103c and 103d respectively, configured to prevent the insects from interfering with the fan. The power source 104 is configured to provide power to the drone. The high voltage generator 105 is configured to generate the high voltage from the power source 104 for the net casting unit 106. The net casting unit 106 is configured to cast a net 106a to trap insects in the insect swarm. The net 106a includes a set of electrically conductive threads and a set of insulators 112 disposed between each of the two electrically conductive threads. The net 106a, upon casting, is supplied with the high voltage from the high voltage generator 105 to decapitate the insects. In some embodiments, each of the set of electrically insulated threads of the net 106a is supplied with the high voltage in a range of about 20000 volts to about 100000 volts.

The chemical dispensing unit 108 is configured to be disposed towards a base portion 106b of the net 106a and is configured to release one or more chemicals that attract the insects to the base portion 106b of the net 106a. By way of an example, the one or more chemicals may include pheromones, carbon dioxide ($CO_2$), or a combination thereof. The coupling unit 107 may include one or more drone couplers. Additionally, a plurality of Light Emitting Diodes (LEDs) may be affixed on the net 106a to attract insects towards the net 106a in the dark. Further, the coupling unit 107 is configured to magnetize one or more drone couplers for electromagnetically coupling the drone 100 with one or more of the plurality of drones as per the drone formation. Further, the drone 100 may include an insulating handle 111 configured to protect a user from the high voltage when the drone is not in operation and when the high voltage generator 105 is functioning.

As will be appreciated by one skilled in the art, a variety of processes may be employed for managing an insect swarm using drones. For example, the exemplary drone 100 may manage the insect swarm by the processes discussed herein. In particular, as will be appreciated by those of ordinary skill in the art, control logic and/or automated routines for performing the techniques and steps described herein may be implemented by the drone 100 either by hardware, software, or combinations of hardware and software. For example, suitable code may be accessed and executed by the one or more processors on the drone 100 to perform some or all of the techniques described herein. Similarly, application specific integrated circuits (ASICs) configured to perform some or all of the processes described herein may be included in the one or more processors on the drone 100.

Figure 2:
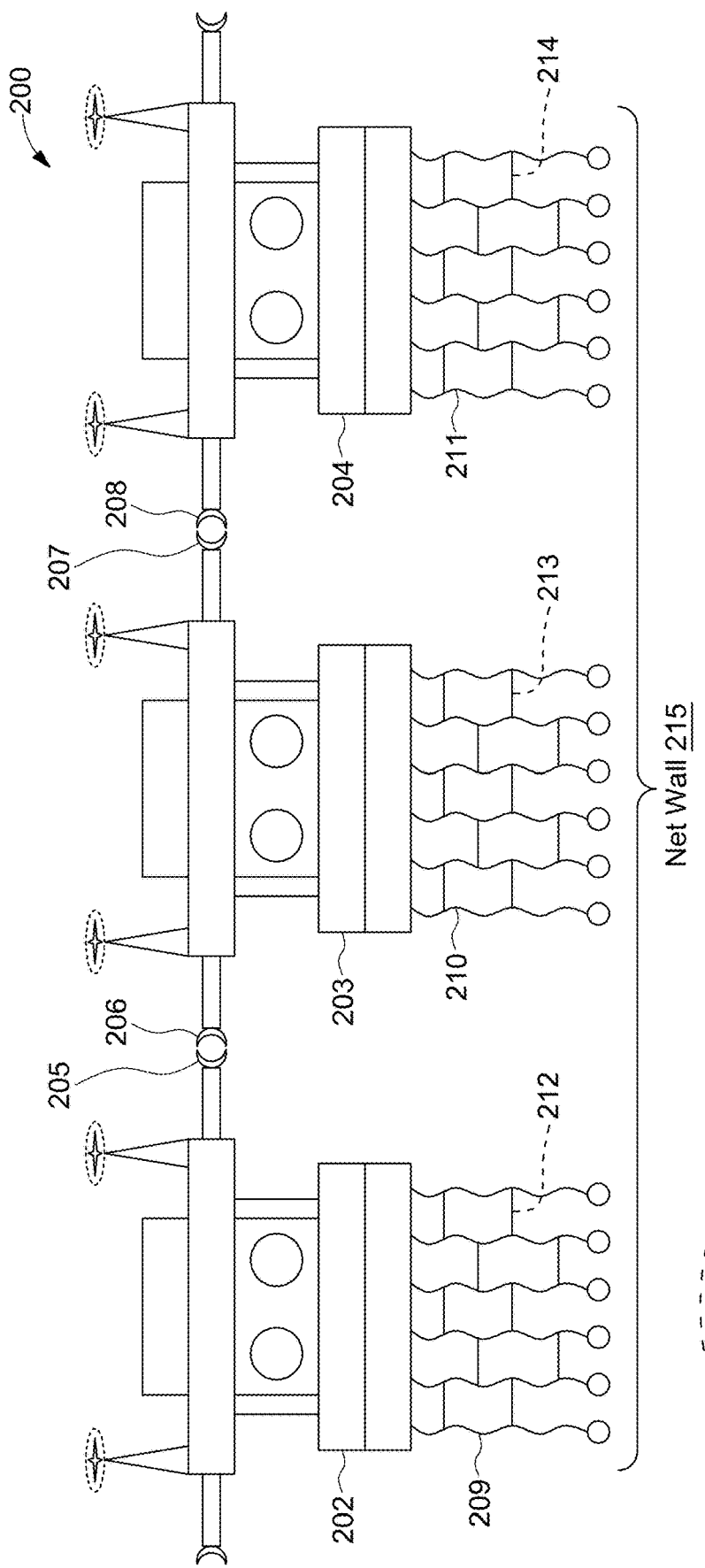
FIG. 2 illustrates an exemplary drone formation for managing an insect swarm, in accordance with some embodiments of the present disclosure.

Referring now to FIG. 2, an exemplary drone formation 200 for managing an insect swarm 201 is illustrated, in accordance with some embodiments of the present disclosure. The drone formation 200 may include a plurality of drones (for example, a drone 202, a drone 203, and a drone 204). In an embodiment, each of the plurality of drones 202, 203, and 204 may be analogous to the drone 100. In an exemplary scenario, at least one of the plurality of drones 202, 203, and 204 may detect and track the insect swarm 201 through a camera or one or more sensors. Further, the drone 202 may communicate with each of the drone 203 and the drone 204 to dynamically align in a position based on the tracking so as to make the drone formation 200.

Each of the plurality of drones 202, 203, and 204 includes a coupling unit (for example, the coupling unit 107). The coupling unit may include one or more drone couplers. By way of an example, the coupling unit of the drone 202 may include a drone coupler 205 and the coupling unit of the drone 203 may include a drone coupler 206. The coupling units of the drone 202 and the drone 203 may magnetize the drone coupler 205 and the drone coupler 206 for electromagnetically coupling the drone 202 and the drone 203 with each other as per the drone formation 200. Similarly, the drone 203 and the drone 204 may be electromagnetically coupled with each other through a drone coupler 207 of the drone 203 and a drone coupler 208 of the drone 204.

Further, each of the plurality of drones 202, 203, and 204 may include a net casting unit (for example, the net casting unit 106). The net casting units of the drone 202, the drone 203, and the drone 204 may cast a net 209, a net 210, and a net 211, respectively, to trap insects in the insect swarm 201. Each of the net 209, the net 210, and the net 211 includes a set of electrically conductive threads and a set of insulators 212, 213, and 214 disposed between each of the two electrically conductive threads. When the plurality of drones 202, 203, and 204 are electromagnetically coupled with each other in the drone formation 200, the net 209, the net 210, and the net 211 are closely placed with each other to form a net wall 215. Each of the net 209, the net 210, and the net 211, upon casting, is supplied with a high voltage through a high voltage generator to decapitate the insects. In an embodiment, the high voltage may be in a range of about 20000 volts to about 100000 volts.

In some embodiments, a chemical dispensing unit (for example, the chemical dispensing unit 108) may be disposed towards a base portion (for example, the base portion 106b) of the net 209, the net 210, and the net 211. The chemical dispensing unit (for example, the chemical dispensing unit 108) may release one or more chemicals that attract the insects to the base portion (for example, the base portion 106b) of the net 209, the net 210, and the net 211. By way of an example, the one or more chemicals may include pheromones, carbon dioxide ($CO_2$), or a combination thereof. The net wall 215 may be a substantially flat wall towards the insects in the insect swarm or a substantially surround wall around an area that includes the insect swarm 201 (for example, a tree, a field, or the like). An insect from the insect swarm 201, upon coming in contact with the net wall 215, is decapitated due to the high voltage.

Figure 3:
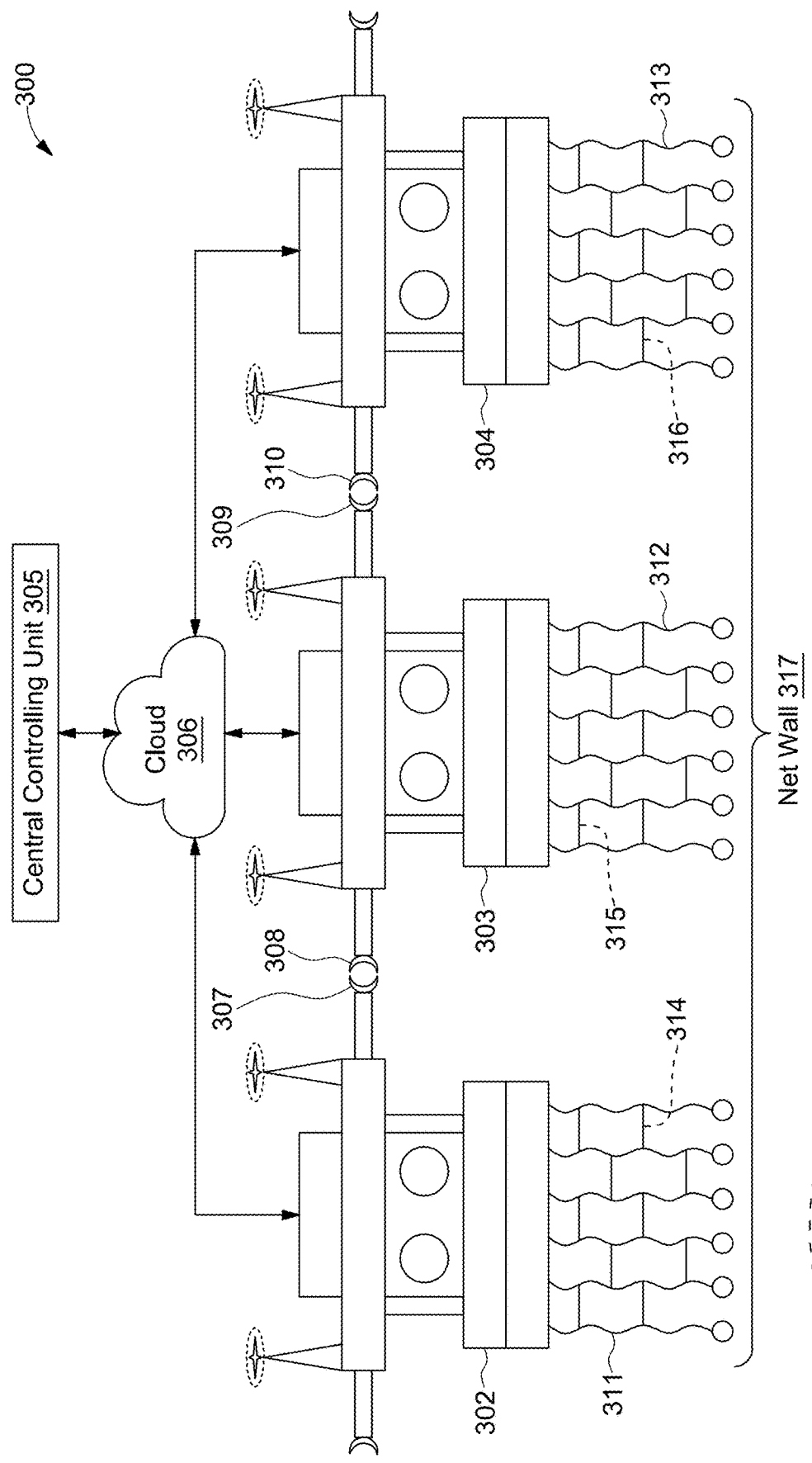
FIG. 3 illustrates another exemplary drone formation for managing an insect swarm, in accordance with some embodiments of the present disclosure.
Figure 3:
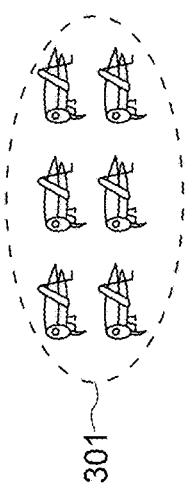

Referring now to FIG. 3, another exemplary drone formation 300 for managing an insect swarm 301 is illustrated, in accordance with some embodiments of the present disclosure. The drone formation 300 may include a plurality of drones (for example, a drone 302, a drone 303, and a drone 304), each communicatively coupled to a central controlling unit 305 (for example, server, desktop, laptop, notebook, netbook, tablet, smartphone, mobile phone, or any other computing device) via a cloud 306, in accordance with some embodiments of the present disclosure. In an embodiment, each of the plurality of drones 302, 303, and 304 may be analogous to the drone 100. It should be noted that the central controlling unit 305 is configured to control and communicate with at least one of the plurality of drones 302, 303, and 304. Additionally, the central controlling unit 305 is manually operated or automatically operated using artificial intelligence (AI) model. In an exemplary scenario, at least one of the plurality of drones 302, 303, and 304 may detect and track the insect swarm 301 through a camera or one or more sensors. Further, the central controlling unit 305 may communicate with each of the drone 302, the drone 303, and the drone 304 to dynamically align in a position based on the tracking so as to make the drone formation 300.

Each of the plurality of drones 302, 303, and 304 includes a coupling unit (for example, the coupling unit 107). The coupling unit may include one or more drone couplers. By way of an example, the coupling unit of the drone 302 may include a drone coupler 307 and the coupling unit of the drone 303 may include a drone coupler 308. The coupling units of the drone 302 and the drone 303 may magnetize the drone coupler 307 and the drone coupler 308 for electromagnetically coupling the drone 302 and the drone 303 with each other as per the drone formation 300. Similarly, the drone 303 and the drone 304 may be electromagnetically coupled with each other through a drone coupler 309 of the drone 303 and a drone coupler 310 of the drone 304.

Further, each of the plurality of drones 302, 303, and 304 may include a net casting unit (for example, the net casting unit 106). The net casting units of the drone 302, the drone 303, and the drone 304 may cast a net 311, a net 312, and a net 313, respectively, to trap insects in the insect swarm 301. Each of the net 311, the net 312, and the net 313 includes a set of electrically conductive threads and a set of insulators 314, 315, and 316 disposed between each of the two electrically conductive threads. When the plurality of drones 302, 303, and 304 are electromagnetically coupled with each other in the drone formation 300, the net 311, the net 312, and the net 313 are closely placed with each other to form a net wall 317. Each of the net 311, the net 312, and the net 313, upon casting, is supplied with a high voltage through a high voltage generator to decapitate the insects. In an embodiment, the high voltage may be in a range of about 20000 volts to about 100000 volts.

In some embodiments, a chemical dispensing unit (for example, the chemical dispensing unit 108) may be disposed towards a base portion (for example, the base portion 106b) of the net 311, the net 312, and the net 313. The chemical dispensing unit (for example, the chemical dispensing unit 108) may release one or more chemicals that attract the insects to the base portion (for example, the base portion 106b) of the net 311 the net 312, and the net 313. By way of an example, the one or more chemicals may include pheromones, carbon dioxide ($CO_2$), or a combination thereof. The net wall 317 may be a substantially flat wall towards the insects in the insect swarm or a substantially surround wall around an area which includes the insect swarm 201 (for example, a tree, a field, or the like). An insect from the insect swarm 301, upon coming in contact with the net wall 317, is decapitated due to the high voltage.

It may be noted that the drone formation may be deployed for managing insect swarms in places such as agricultural fields, urban sewers, housing complexes, indoors of residences and commercial spaces, and the like. It may also be noted that using a drone formation for managing an insect swarm may be a specific use-case scenario. The electromagnetically coupled drone formation, in general, may be used for a variety of other purposes and may not be specifically limited to managing an insect swarm. In an embodiment, one or more drones in the electromagnetically coupled drone formation may include a plurality of LEDs and dynamically provide illumination in dark. In another embodiment, one or more drones in the electromagnetically coupled drone formation may include water sprinklers for applications in agricultural irrigation. As will be appreciated, the above embodiments are intended to be exemplary and not limiting to the scope of the invention.

Figure 4:
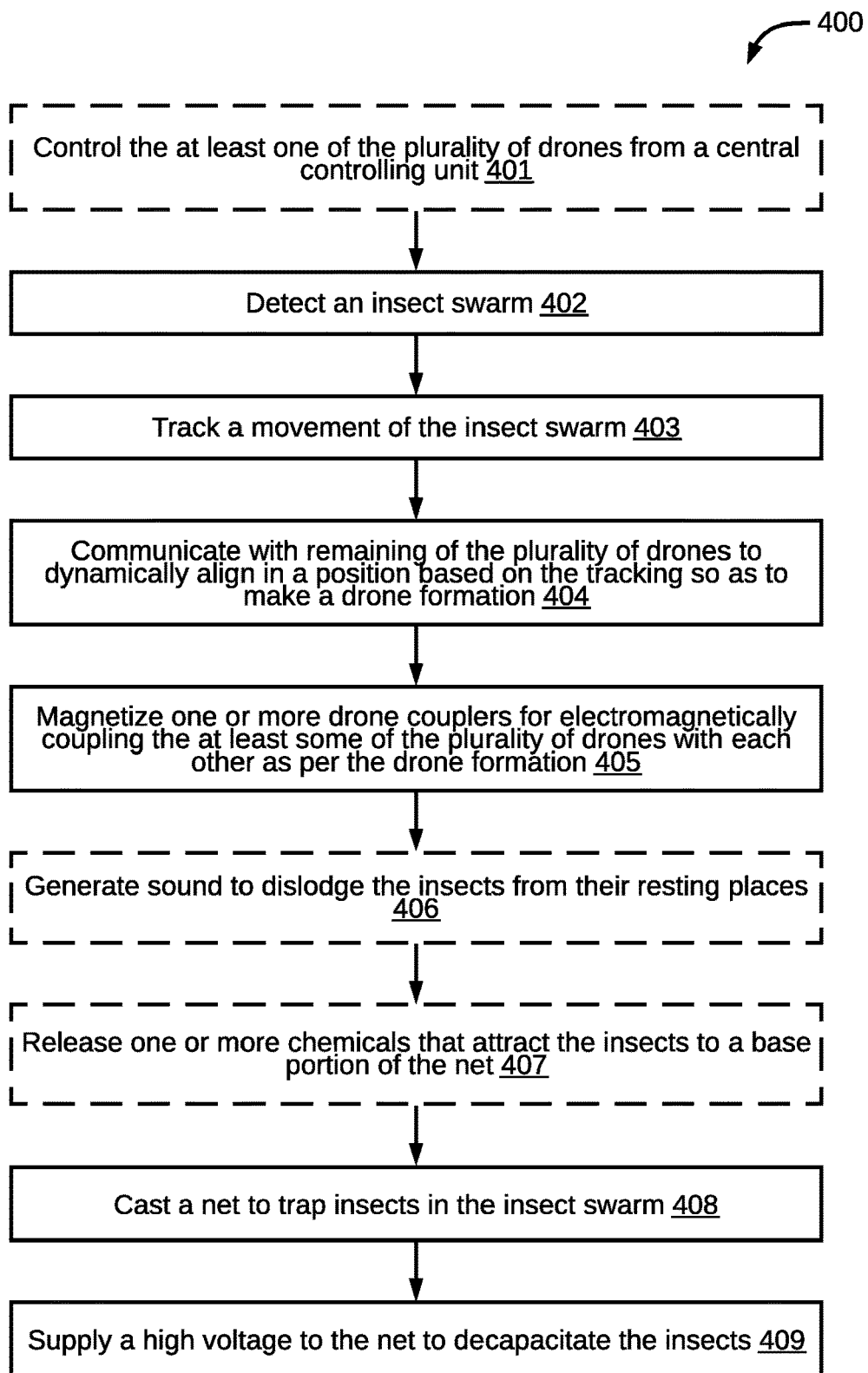
FIG. 4 illustrates a flow diagram of an exemplary process for managing an insect swarm, in accordance with some embodiments of the present disclosure.

Referring now to FIG. 4, an exemplary process 400 for managing an insect swarm is depicted via a flowchart, in accordance with some embodiments of the present disclosure. In an embodiment, the process 400 may be implemented by the drone 100. The process 400 includes controlling the at least one of the plurality of drones (for example, the plurality of drones 302, 303, and 304) from a central controlling unit (such as the central controlling unit 305), at step 401. The central controlling unit is manually operated or automatically operated using AI model. In an embodiment, each of the plurality of drones is autonomous and functions independent of the central controlling unit (for example, the drone formation 200). Further, the process 400 may include detecting an insect swarm (such as, the insect swarm 201), at step 402. Further, the process 400 may include tracking a movement of the insect swarm, at step 403. It may be noted that detecting and tracking the insect swarm is based on at least one of: movement of the insects in the insect swarm, images of the insect swarm, and sound of the insects in the insect swarm. By way of an example, the environment data capturing unit of at least one of the plurality of drones 202, 203, and 204 may detect and track the insect swarm 201 through the sound generator and detector 109 and the camera 110 of the environment data capturing unit 101.

Further, the process 400 may include communicating with remaining of the plurality of drones, to dynamically align in a position based on the tracking so as to make a drone formation, at step 404. In an embodiment, the central controlling unit may communicate with the plurality of drones to dynamically make the drone formation. The drone formation may include two or more of the plurality of drones electromagnetically coupled to cast one of a substantially flat net wall (for example, the net wall 215) towards the insects in the insect swarm, or a substantially surround net wall (for example, the net wall 215) around the insects in the insect swarm. In an embodiment, the drone formation is dynamically determined to cast a wider net and to arrest further movement of the insects in the insect swarm.

Further, the process 400 may include magnetizing, by at least some of the plurality of drones in the drone formation, one or more drone couplers for electromagnetically coupling the at least some of the plurality of drones with each other as per the drone formation, at step 405. In continuation of the example above, the drone 202 may communicate with the drone 203 and the drone 204 for dynamically aligning in a position to make the drone formation 200. Further, the drone coupler 205 of the drone 202 and the drone coupler 206 of the drone 203 may be magnetized to electromagnetically couple the drone 202 with the drone 203. Similarly, the drone 203 may be electromagnetically coupled with the drone 204 to complete the drone formation 200.

Further, the process 400 may include generating sound to dislodge the insects from their resting places, at step 406. Further, the process 400 may include releasing, by each of the plurality of drones, one or more chemicals that attract the insects to a base portion of the net, at step 407. In an embodiment, at least one of the plurality of drones may move close to the resting places of the insects. In such an embodiment, the plurality of fans of the at least one of the plurality of drones may produce downward winds to dislodge the insects from their resting places. In another embodiment, at least one of the plurality of drones may include a plurality of LEDs to attract the insects to the base portion of the net. In continuation of the example above, the drone 202 may generate sound waves to dislodge the insects of the insect swarm 201 from their resting places. Additionally, the chemical dispensing unit of the drone 202 may release chemicals (for example, pheromones, carbon dioxide ($CO_2$), or a combination thereof) to attract the insects towards the net 209. Further, the process 400 may include casting, by each of the plurality of drones, a net (for example, the net 209 of the drone 202) to trap insects in the insect swarm, at step 408. The net includes a set of electrically conductive threads and a set of insulators disposed between each of the two electrically conductive threads. Alternatively, a vacuum pump may be attached above the net casting unit to produce a region of air pressure difference. An insect near the region of air pressure difference may be pulled towards the net.

Further, the process 400 may include supplying, by each of the plurality of drones, a high voltage to the net to decapitate the insects, at step 409. Each of the set of electrically insulated threads of the net is supplied with the high voltage in a range of about 20000 volts to about 100000 volts. In an embodiment, the method may further include releasing one or more chemicals that attract the insects to the base portion of the net. In continuation of the example above, the high voltage generator of each of the drone 202, the drone 203, and the drone 204 may produce high voltage electricity through the set of electrically conductive threads of the net 209, the net 210, and the net 211, respectively. An insect from the insect swarm 201, upon coming in contact with the net wall 215, is decapitated due to the high voltage. In an embodiment, the process 400 may include steps 402-409 when each of the plurality of drones is autonomous and functions independent of the central controlling unit.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. The disclosed methods and systems may be implemented on a conventional or a general-purpose computer system, such as a personal computer (PC) or server computer.

Thus, the disclosed system and method try to overcome the technical problem of managing an insect swarm using drones. The system and method provide a drone with a net made of a set of electrically conductive threads. Further, the drone includes a high voltage generator to supply high voltage electricity to the set of electrically conductive threads of the net. Further, the drone may include one or more drone couplers. The one or more drone couplers may be magnetized for electromagnetic coupling of the drone with another such drone. Further, a plurality of such drones may be electromagnetically coupled with each other dynamically to make a drone formation. The drone formation provides a net wall of closely spaced nets of the plurality of drones. The plurality of drones may attract insects from their resting places by generating sound waves and releasing chemicals. Further, an insect, upon coming in contact with the net wall, may be decapitated due to the high voltage electricity.

As will be appreciated by those skilled in the art, the techniques described in the various embodiments discussed above are not routine, or conventional, or well understood in the art. The techniques discussed above provide for managing an insect swarm using drones. The techniques first detect, by at least one of a plurality of drones, an insect swarm. The techniques may then track, by the at least one of a plurality of drones, a movement of the insect swarm. The techniques may then communicate, by the at least one of the plurality of drones with remaining of the plurality of drones, to dynamically align in a position based on the tracking so as to make a drone formation. The techniques may then magnetize, by at least some of the plurality of drones, one or more drone couplers for electromagnetically coupling the at least some of the plurality of drones with each other as per the drone formation. The techniques may then cast, by each of the plurality of drones, a net to trap insects in the insect swarm. The techniques may then supply, by each of the plurality of drones, a high voltage to the net to decapitate the insects.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described system and method for managing an insect swarm using drones. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing an insect swarm, the method comprising:
   detecting, by at least one of a plurality of drones, an insect swarm;
   tracking, by the at least one of the plurality of drones, a movement of the insect swarm;
   receiving, by the at least one of the plurality of drones, a drone formation data from a central controlling unit, wherein the central controlling unit is communicatively coupled to the plurality of drones and is configured to dynamically determine, based on the tracking, a drone formation using at least two or more of the plurality of drones;
   communicating, by the at least one of the plurality of drones with remaining of the plurality of drones, to dynamically align in a position based on the drone formation data so as to make the drone formation;
   magnetizing, by at least some of the plurality of drones, one or more drone couplers for electromagnetically coupling the at least some of the plurality of drones with each other as per the drone formation;
   casting, by each of the plurality of drones, a net to form a net wall from the net of each of the plurality of drones to trap insects; and
   supplying, by each of the plurality of drones, a high voltage to the net to decapitate the insects.

2. The method of claim 1, wherein detecting and tracking the insect swarm is based on at least one of: movement of the insects in the insect swarm, images of the insect swarm, and sound of the insects in the insect swarm.

3. The method of claim 1, further comprising, at least one of:
   generating, by the at least one of the plurality of drones, sound to dislodge the insects from their resting places; and
   releasing, by each of the plurality of drones, one or more chemicals that attract the insects to a base portion of the net.

4. The method of claim 1, wherein the drone formation comprises two or more of the plurality of drones electromagnetically coupled to cast one of:
   a substantially flat net wall towards the insects in the insect swarm, or
   a substantially surrounding net wall around the insects in the insect swarm.

5. The method of claim 1, further comprising controlling at least one of the plurality of drones from the central controlling unit, wherein the central controlling unit is manually operated or automatically operated using artificial intelligence (AI) model.

6. A method for managing an insect swarm, the method comprising:
   detecting, by at least one of a plurality of drones, an insect swarm;
   tracking, by the at least one of the plurality of drones, a movement of the insect swarm;
   dynamically determining, by the at least one of the plurality of drones and based on the tracking from the plurality of drones, a drone formation using at least two or more of the plurality of drones;
   communicating, by at least one of the plurality of drones with remaining of the plurality of drones, to dynamically align in a position as per the drone formation;
   magnetizing, by at least some of the plurality of drones, one or more drone couplers for electromagnetically coupling the at least some of the plurality of drones with each other as per the drone formation;
   casting, by each of the plurality of drones, a net to form a net wall from the net of each of the plurality of drones to trap insects; and
   supplying, by each of the plurality of drones, a high voltage to the net to decapitate the insects.

7. The method of claim 6, wherein detecting and tracking the insect swarm is based on at least one of: movement of the insects in the insect swarm, images of the insect swarm, and sound of the insects in the insect swarm.

8. The method of claim 6, further comprising, at least one of:
   generating, by the at least one of the plurality of drones, sound to dislodge the insects from their resting places; and
   releasing, by each of the plurality of drones, one or more chemicals that attract the insects to a base portion of the net.

9. The method of claim 6, wherein the drone formation comprises two or more of the plurality of drones electromagnetically coupled to cast one of:
   a substantially flat net wall towards the insects in the insect swarm, or
   a substantially surrounding net wall around the insects in the insect swarm.

* * * * *